L. B. ARNOLD.
Milk Cooler.
No. 85,160. Patented Dec. 22, 1868.
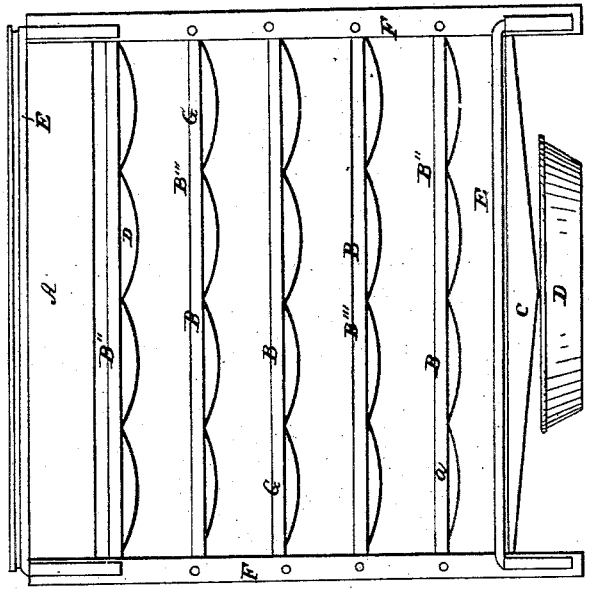
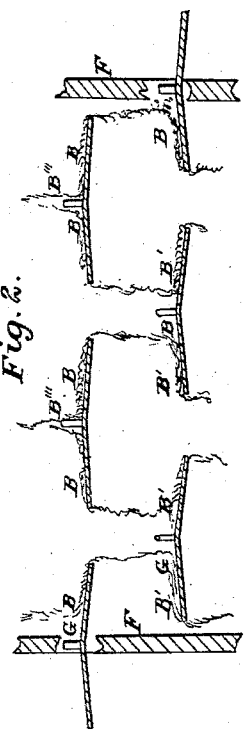
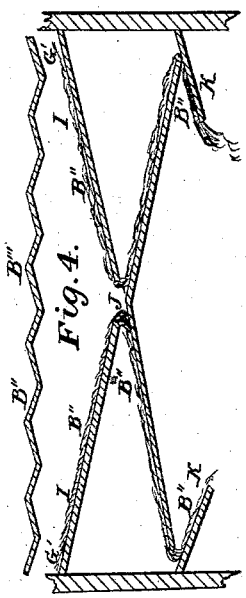
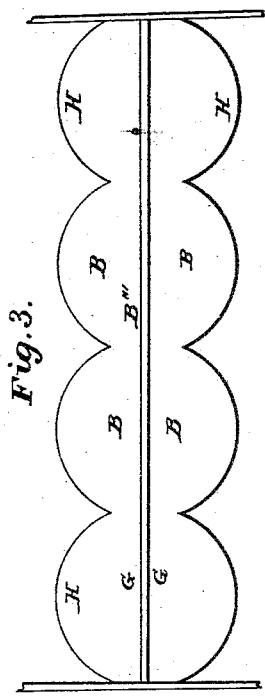
Witnesses:
Samuel J. Parker
O. G. Hinman
Inventor:
Lauren B. Arnold

LAUREN B. ARNOLD, OF LANSING, NEW YORK.

Letters Patent No. 85,160, dated December 22, 1868.

IMPROVEMENT IN MILK-COOLERS.

The Schedule referred to in these Letters Patent and making part of the same.

*To all whom it may concern:*

Be it known that I, LAUREN B. ARNOLD, of Lansing, Tompkins county, New York, have invented an Improvement in Cooling and Airing Milk; and I do hereby declare that the following is a full and exact description thereof, reference being had to the accompanying drawings, and to the letters thereon.

Figure 1 is a side view of my cooling and airing-frame, with the plates and other parts in it;

Figure 2 is an end view of the arrangement of my cooling and airing-plates;

Figure 3, a view from above of one of my cooling and airing-plates; and

Figure 4 are views of a modification of my plates in one of the forms in which I make it.

My object is to cool and air freshly-drawn milk by spreading it in small rills, or in sheets, and deprive it of the animal odoriferous gases, and otherwise benefit it by the free action of air.

This I accomplish by making a series of metallic plates, and so arranging them that they shall receive the flowing currents of milk, and, by the air and exposed surface, cool them, and benefit the milk.

My particular forms are seen in the drawings, where, in fig. 1, A is a reservoir, which receives the strained milk, and, through openings made adjustable or suitable by any means, I let down a fine flow of milk on the metallic, porcelain, or other plates, B, the milk first flowing over the upper sections of the plates, down upon the other series of plates, and finally collecting in the basin or bottom, C, whence it flows into the milk-pans or pails D. The plates are made of any suitable length or width. A size I prefer, and very convenient, is twelve inches wide and twenty inches long, and repeating the series of plates, so as to cool in a reasonable time the daily supply of milk. Of course the larger the dairy, the larger the machine or cooler. Further to aid the flow of the milk, I use the stiffening-ribs B''' on the back of the plates, from the ridge to the sides; that is, the milk out of the receiver A falls, in the first instance, on the ridges B''', or on the ledges G, and thence off of the edges of the plates B, on the ledges or ridges below, until the hollow plate C is reached, whence it flows into common milk-pans D, pails, or is conveyed to the cheese-vat by pipes, as desired.

In fig. 2, the milk, by red lines, is seen to fall on two ridges, B''', and one ledge, G, and thence off the upper plate on the five ledges, G, in the manner just stated, and in like manner on the collector C, and into the pan D.

In fig. 3, one of the sections of the plates is seen from above. The milk flows from the ridges B''' or ledges G to the edges H.

In fig. 4, two views of a modification are seen. Instead of a series of several narrow plates, B, figs. 1 and 2, I construct broad plates B'', with corrugations and frequent ridges, B''''. The upper figure is a longitudinal section of such a plate. The lower figure is the arrangement seen in section of the plates, in which the upper one, I, being concave, and with an opening in the centre, and corrugated, as just stated, the flow of milk out of the receiver, A, fig. 1, falls at G', drops off of this plate in the centre, on the middle of the corrugated plate J beneath, and off of the ends of J on the corrugated two-parted plate K, which is like the plate I, and so on until it reaches the collecting-plate C, as has been described. The plates are held in place by a frame, F, made of metal, or wood, or other material, and adjusted together by the rods E, or other means, so that it can be readily taken apart, and the whole scalded and washed. I prefer that all parts be made of tin or tin-ware.

The advantages and uses of my invention are apparent to those skilled in the arts to which it appertains.

I am aware that gutters, troughs, pipes, and other similar devices have been used to cool milk, and of the existence of flat cooling-surfaces as a part of the art of cooling, as applied to various purposes; but

What I claim as my invention, is—

1. The series of plates B B, one over the other, between the reservoir A and collecting-basin C, made substantially as described, whereby the milk is spread in sheets, and falls in streamlets through the air, for the purpose of cooling milk, and depriving it of its animal odor and deleterious gases, as set forth.

2. The combination of the reservoir and diffuser A, plates B, and collecting-basin C, in the frame F, for the purposes as set forth.

LAUREN B. ARNOLD.

Witnesses:
SAMUEL J. PARKER,
O. G. HOWARD.